US012762423B2

(12) United States Patent
Jarrett et al.

(10) Patent No.: US 12,762,423 B2
(45) Date of Patent: Oct. 13, 2026

(54) REINFORCEMENT LEARNING USING HINDSIGHT TO MODEL UNPREDICTABLE ASPECTS OF THE FUTURE

(71) Applicant: GDM Holding LLC, Mountain View, CA (US)

(72) Inventors: Daniel Jarrett, London (GB); Corentin Tallec, Paris (FR); Florent Altché, Paris (FR); Thomas Mesnard, Paris (FR); Remi Munos, London (GB); Michal Valko, Paris (FR)

(73) Assignee: GDM Holding LLC, Mountain View, CA (US)

( * ) Notice: Subject to any disclaimer, the term of this patent is extended or adjusted under 35 U.S.C. 154(b) by 629 days.

(21) Appl. No.: 18/238,400

(22) Filed: Aug. 25, 2023

(65) Prior Publication Data

US 2025/0068919 A1 Feb. 27, 2025

(51) Int. Cl.
*G06N 3/092* (2023.01)
*G06N 3/044* (2023.01)
*G06N 3/045* (2023.01)

(52) U.S. Cl.
CPC ............. *G06N 3/092* (2023.01); *G06N 3/044* (2023.01); *G06N 3/045* (2023.01)

(58) Field of Classification Search
CPC ........ G06N 3/006; G06N 3/044; G06N 3/045; G06N 3/047; G06N 3/084; G06N 3/088; G06N 3/092; G06N 7/01
See application file for complete search history.

(56) References Cited

PUBLICATIONS

Pathak et al., "Curiosity-driven Exploration by Self-supervised Prediction", May 15, 2017, arXiv:1705.05363v1, pp. 1-12. (Year: 2017).*
Depeweg et al., "Decomposition of Uncertainty in Bayesian Deep Learning for Efficient and Risk-sensitive Learning", Jun. 15, 2018, arXiv:1710.07283v4, pp. 1-15. (Year: 2018).*
Abdolmaleki et al., "Maximum a posteriori policy optimisation," CoRR, submitted on Jun. 14, 2018, arXiv: 1806.06920v1, 23 pages.
Jarrett et al., "Curiosity in Hindsight: Intrinsic Exploration in Stochastic Environments," CoRR, submitted on Jul. 14, 2023, arXiv:2211.10515v2, 37 pages.
Mesnard et al., "Counterfactual Credit Assignment in Model-Free Reinforcement Learning," CoRR, submitted on Dec. 14, 2021, arXiv: 2011.09464v2, 30 pages.
Schulman et al., "Proximal Policy Optimization Algorithms," CoRR, submitted on Aug. 28, 2017, arXiv: 1707.06347v2, 12 pages.

* cited by examiner

*Primary Examiner* — Brent Johnston Hoover
(74) *Attorney, Agent, or Firm* — Fish & Richardson P.C.

(57) ABSTRACT

Methods, systems, and apparatus, including computer programs encoded on computer storage media, for training a neural network used to select actions to be performed by an agent interacting with an environment. Implementations of the method model unpredictable aspects of the future, using hindsight. They use this information to disentangle inherently unpredictable, aleatoric variation, from epistemic uncertainty that arises from lack of knowledge of the environment. They then use the epistemic uncertainty, which relates to in principle predictable aspects of the environment, as a source of intrinsic reward to drive curiosity, i.e. exploration of the environment by the agent.

20 Claims, 6 Drawing Sheets

REINFORCEMENT LEARNING USING HINDSIGHT TO MODEL UNPREDICTABLE ASPECTS OF THE FUTURE

BACKGROUND

This specification relates to reinforcement learning.

In a reinforcement learning system an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network. Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes reinforcement learning systems that control an agent interacting with an environment. Implementations of the system model unpredictable aspects of the future, using hindsight. They use this information to disentangle inherently unpredictable, aleatoric variation, from epistemic uncertainty that arises from lack of knowledge of the environment. They then use the epistemic uncertainty, which relates to in principle predictable aspects of the environment, as a source of intrinsic reward to drive curiosity, i.e. exploration of the environment by the agent.

In one aspect there is described a method performed by one or more computers, and a corresponding system. The method can be used for selecting actions to be performed by an agent in an environment using a policy neural network.

The method obtains an observation representation representing an observation of the environment at a time step. The method processes the observation of the environment at the time step, e.g. by processing the observation representation or by processing another representation of the observation, using the policy neural network, to generate a policy output. The policy output is used to select an action to be performed by the agent at the time step.

The method also processes the observation representation at the time step, an observation representation at a next time step (using hindsight), and an action representation representing the action performed at the time step, using a generator neural network, to generate a latent representation for the next time step. The method processes the observation representation at the time step, the action representation at the time step, and the latent representation for the next time step, using an environment model neural network, to generate a reconstructed representation for the observation at the next time step.

The environment neural network is trained using a reconstruction objective, e.g. a loss, that depends on a difference between a version of the observation representation at the next time step and the reconstructed representation for the observation at the next time step. The generator neural network is trained using an independence ("invariance") objective, e.g. a loss, that depends on a degree of independence between the latent representation for the next time step and each of i) the observation representation at the time step and ii) the action representation representing the action performed at the time step, to encourage the degree of independence.

The method determines an intrinsic reward using at least the reconstruction objective i.e. using a value of the reconstruction objective. In implementations the intrinsic reward is also determined using the independence objective i.e. using a value of the independence objective, e.g. by combining values of these objectives. The policy neural network is trained based on the intrinsic reward using a reinforcement learning technique. Any reinforcement learning technique can be used.

In a related aspect there is described a computer-implemented method of training a policy neural network as described above. The method involves training a generator neural network, in hindsight, using an independence objective, to generate a latent representation that comprises a representation of (inherently) unpredictable future noise in the environment independent of a current state of the environment and a current action performed by the agent. The method also trains an environment neural network, using a reconstruction objective, to generate a reconstructed representation of a future state of the environment based on a representation of the current state of the environment, a representation of the current action, and the latent representation. An intrinsic reward is determined from at least the reconstruction objective, e.g. from a combination of the reconstruction objective and the independence objective, and is used to train the policy neural network.

There is also described an agent including a policy neural network trained as described above.

Particular embodiments of the subject matter described in this specification can be implemented so as to realize one or more of the following advantages.

Efficient exploration of an environment by an agent is a difficult problem. Some approaches to the problem use "curiosity" to drive exploration, where the agent is rewarded based upon how much a realized outcome differs a predicted outcome. However using predictive error as an intrinsic reward fails in stochastic environments as the agent can become fixated on high entropy regions of the environment, the so-called "noisy TV" problem. Implementations of the described system address this by learning representations of the future that capture inherently unpredictable aspects of the environment in hindsight, and these are then used as the basis for reconstructions. As the error in the predictable but unknown aspects of the environment decreases, i.e. as the epistemic uncertainty decreases, the intrinsic reward also decreases. Hindsight enables the system to learn representations, and hence generate reconstructions, that capture the unpredictable variation.

Implementations of the system can use hindsight information to capture stochasticity of a variety of types. This includes stochasticity that is entirely random, such as a viewport in the environment that is polluted by random noise; stochasticity that is state-dependent, such as a visible object that moves apparently randomly in the environment; and stochasticity that is action-dependent, such as a random observation that only appears in response to specific actions or other noise actively induced by the agent. Whilst some techniques can handle random noise they can fail with other types of stochasticity. Some other techniques can also fail to learn well in the presence of a low, but diffuse or pervasive level of noise, particularly where other, e.g. task-related, rewards are sparse.

By contrast implementations of the described system can explore "difficult" environments more efficiently, i.e. faster, and with reduced computational resources. They can also explore parts of the environment that other agents fail to reach at all. This in turn facilitates learning an action selection policy for controlling the agent, e.g. to perform a particular task. The described techniques can be particularly useful where "external" rewards, such as task-related rewards from the environment, are sparse or non-existent.

Some implementations of the system are useful in a multi-agent setting, where the environment includes one or more other agents, which may be other machine learning systems and/or human agents. This is because the system can learn to ignore noise resulting from the behavior of the other agents, whereas some other techniques can become stuck when observing another agent because of the novel observations that this generates.

Implementations of the described techniques can be incorporated into existing reinforcement learning systems to speed up learning, reduce the compute, and achieve better performance; they are suitable for use with any type of reinforcement learning technique.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE FIGURES

Like reference numbers and designations in the various drawings indicate like elements.

DETAILED DESCRIPTION

Figure 1:
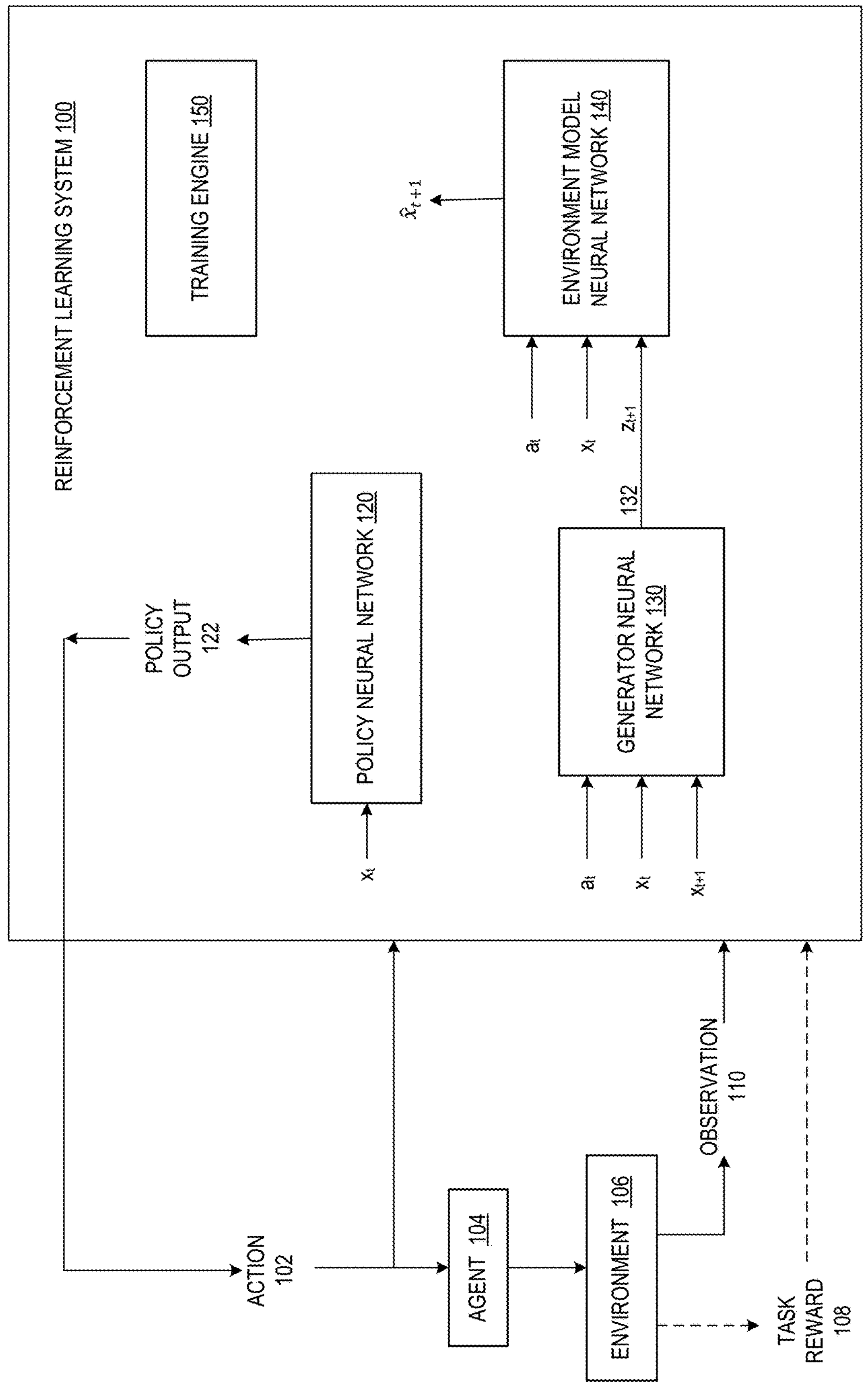
FIG. 1 shows a first example reinforcement learning system.

FIG. 1 shows a first example of a reinforcement learning system 100, that may be implemented as one or more computer programs on one or more computers in one or more locations, for training a policy neural network 120. The policy neural network 120 is used to control an agent 102 interacting with an environment 104 to select actions 102 to be performed by the agent, to explore the environment or to perform a task.

Data characterizing a state of the environment is referred to herein as an observation 110. An observation can be a multimodal observation, for example a combination of a still or moving image and natural language.

The reinforcement learning system 100 obtains an observation 110 of the environment 104 at each of a succession of time steps. In implementations the observation at a time step is processed to obtain an observation representation, $x_t$, representing the observation at the time step. The observation representation may be any sort of representation of the observation, e.g. representations sometimes referred to as "contexts", "features", "beliefs", or "embeddings" (an embedding is an ordered collection of numerical values). It may include a representation of a history of observations at one or more previous time steps. The observation representations are used by a generator neural network 130 and by an environment model 140 as described further later.

The policy neural network 120 controls the agent by processing the observation 110 at a time step to generate a policy output 122 that is used to select an action at the time step for controlling the agent. In implementations the policy neural network 120 processes the observations by processing representations of the observations; these may be the same as, or different to, the representations of the observations used by the generator neural network 130 and by the environment model 140.

There are many ways in which the policy output 122 can be used to select actions. For example it can define an action directly, e.g. by identifying a speed or torque for a mechanical action; or it can parameterize a distribution from over possible actions, e.g. a Gaussian distribution, according to which the action may be selected e.g. stochastically; or it can define a set of scores for each action of a set of possible actions, according to which an action can be selected. In general an action may be continuous or discrete. The "action" may comprise multiple individual actions to be performed at a time step e.g. a mixture of continuous and discrete actions. In some implementations the policy neural network 120 has multiple heads, and the policy output 122 comprises multiple outputs for selecting multiple actions at a particular time step.

The policy neural network 120, and in general each of the neural networks described herein, can have any suitable architecture and may include, e.g., one or more feed forward neural network layers, one or more convolutional neural network layers, one or more attention neural network layers, or one or more normalization layers. In some implementations a neural network as described herein may be distributed over multiple computers.

The policy neural network 120 is trained using the observations 110 and based on rewards received, under the control of a training engine 150. In general a reward comprises a numerical value, and may be positive, negative, or zero. The system generates an intrinsic reward, used to drive exploration of the environment. In some cases the system also receives a task-related reward 108 from the environment that characterizes progress made on a task performed by the agent, e.g. representing completion of a task or progress towards completion of the task as a result of the agent performing the selected action.

The policy neural network 120 is trained, based on the observations and rewards, using a reinforcement learning technique. Any type of reinforcement learning technique can be used, e.g. a model-based or model-free technique, e.g. based on Q-learning or on a policy gradient approach, or using another policy optimization technique such as MPO (Abdolmaleki et al., arXiv:1806.06920) or PPO (Schulman et al., arXiv:1707.06347); it may comprise an actor-critic technique.

As used herein training a neural network refers to iteratively adjusting parameters, e.g. weights, of the neural network to optimize the value of an objective function, e.g. to minimize the value of a loss function. For example in implementations the policy neural network 120 is trained using a reinforcement learning objective based on the rewards received, e.g. an objective based on a Bellman error or on a policy optimization objective. The training may be performed by backpropagating gradients of the objective function to update values of the neural network parameters, e.g. using an optimization algorithm such as Adam. In general the policy neural network 120 is trained to encourage an increase in a cumulative measure of rewards received, e.g. a time-discounted sum of rewards or "return".

There are many applications of the system 100 and some example applications are described in more detail later. As one example, the environment may be a real-world or simulated environment, and the agent may be a mechanical agent such as a robot or autonomous or semi-autonomous vehicle, or a simulation of such a mechanical agent. The policy neural network 120 can select actions to be performed by the agent in response to observations, e.g. image observations, obtained from the environment, to control the agent.

As another example the agent can be a software agent in a natural language processing environment. Then the policy neural network 120 may comprise a language model neural network configured, e.g. pre-trained, to process a natural language observation to generate a sequence of tokens from a vocabulary of tokens, e.g. representing words or wordpieces. The actions can relate to selection of a token or to selection of the sequence of tokens. The software agent can perform, e.g., any type of natural language processing task, such as a language generation or machine translation task. Implementations of the system can be used, for example, to fine tune a language model to perform a particular language processing task, e.g. based on rewards determined from one or more metrics of the task, such as a BLEU (BiLingual Evaluation Understudy) metric for translation or a diversity metric for a language generation task; and/or based on rewards derived from human feedback.

The environment can be a multi-agent environment. That is, the environment can include one or more other agents, e.g. computer-controlled agents and/or people. These may be performing tasks or may simply be present in the environment. Implementations of the described system are able, when exploring the environment, to disregard novelty in the environment induced by the presence of such other agents.

As previously mentioned, the system 100 includes a generator neural network 130. The generator neural network 130 is configured to process the observation representation at a time step, $x_t$, an observation representation at a next time step, $x_{t+1}$, and an action representation, at, representing the action performed at the time step, in accordance with generator neural network parameters, to generate a latent representation 132 for the next time step, $z_{t+1}$. The action representation may be any sort of representation of the action, e.g. a variable representing the action, an action embedding, or any other representation of the action. The processing may be performed in hindsight, i.e. at or after the next time step in order that the observation representation at the next time step, $x_{t+1}$, is available.

The system 100 also includes an environment neural network 140. The environment neural network 140 is configured to process the observation representation at the time step, $x_t$, the action representation at the time step, at, and the latent representation for the next time step, $z_{t+1}$, in accordance with environment model neural network parameters, to generate a reconstructed representation for the observation at the next time step, $x_{t+1}$. In implementations the reconstructed representation is a reconstruction of the representation of the observation at the next time step, rather than a reconstruction of the observation itself.

An aim is for the (hindsight) latent representation, $z_{t+1}$, to represent unpredictable aspects of the environment, in particular stochasticity of various types. Thus the latent representation, $z_{t+1}$ should be usable to reconstruct (rather than predict) the observation representation at the next time step, $x_{t+1}$. However the latent representation, $z_{t+1}$, is generated using the observation representation at the next time step, $x_{t+1}$, and the reconstructed representation for the observation at the next time step, $x_{t+1}$, is generated using the latent representation, $z_{t+1}$. There is therefore potential for the latent representation, $z_{t+1}$, to "leak" predictable information to the environment neural network. Implementations of the system therefore use two different training objectives, a reconstruction objective and an independence or "invariance" objective, as detailed below.

The training engine 150 is configured to train the environment neural network 140 using a reconstruction objective, e.g. a reconstruction loss, that depends on a difference between a version of the observation representation at the next time step and the reconstructed representation for the observation at the next time step.

In some implementations the version of the observation representation at the next time step is the observation representation at the next time step. In some implementations, e.g. as described with reference to FIG. 3 later, the version of the observation representation at the next time step is determined using a target version of the encoder neural network 180. The target version of the encoder neural network 180 has parameters that are determined based on parameters of an encoder neural network 170 used to process the observation of the environment at the (current) time step.

As one example, the reconstruction objective may be a reconstruction loss determined by evaluating a difference between the observation representation at the next time step, $x_{t+1}$, and the corresponding reconstructed representation, $x_{t+1}$, e.g. as $\|x_{t+1}-x_{t+1}\|$, where $\|\cdot\|_2$ denotes an L2 norm. As another example, an observation representation generated by the encoder neural network 170 may be denoted $w_t$, and an observation representation generated by the target version of the encoder neural network 180 may be denoted $w_{t+1}$. The reconstruction loss may then be determined by evaluating a difference between the version of the observation representation at the next time step, $w_{t+1}$, and the corresponding reconstructed representation, $$\hat{w}_{t,1}, \text{ e.g. as } \|w_{t+1} - \hat{w}_{t,1}\|_2^2.$$

The training engine 150 is configured to train the generator neural network 130 using an independence (invariance) objective, e.g. an independence loss, that depends on a degree of independence between the latent representation for the next time step and each of i) the observation representation at the time step, and ii) the action representation representing the action performed at the time step. This encourages independence between the latent representation for the next time step, $z_{t+1}$, and each of $x_t$ and at, i.e. encouraging $z_{t+1}$, to be independent of, or invariant to, $x_t$ and at. This in turn encourages $z_{t+1}$ only to represent unpredictable stochasticity, inhibiting leakage of predictable information to the environment neural network.

There are many ways that that the independence objective, e.g. an independence loss, may be determined. As one example, as described with reference to FIG. 2, a critic neural network 160 can be maintained, to generate a critic neural network output that is used to determine the independence loss.

In implementations the generator neural network 130 is trained by backpropagating gradients of the independence loss, $L^{ind}$ through the generator neural network 130 to adjust the parameters of the generator neural network. Where the critic neural network 160 is present this may also involve backpropagating these gradients through the critic neural network 160, to adjust parameters of the critic neural network 160.

In implementations the environment model neural network 140 is trained by backpropagating gradients of the reconstruction loss, $L^{rec}$, through the environment model neural network 140 and the generator neural network 130, to adjust the parameters of the environment model neural network and the parameters of the generator neural network.

Thus in implementations the latent representation, $z_{t+1}$, comprises a (hindsight) representation of inherently unpredictable future noise in the environment, where the future noise is independent of a current state of the environment and a current action performed by the agent.

In implementations an intrinsic reward as described above is determined from at least the reconstruction objective, e.g. from a value of the reconstruction loss, and used by the training engine 150 to train the policy neural network 120 using a reinforcement learning technique. Implementations of the system learn to remove stochasticity from the reconstructed representation for the observation at the next time step, and the reconstruction loss can therefore represent aspects of the environment that are inherently predictable, but unknown. The value of the reconstruction objective can therefore represent a useful source of intrinsic reward, encouraging the agent to explore the environment without becoming fixated on unpredictable aspects of the environment. Generally the reconstruction error reduces as the environment model better learns to represent the true environment.

In some implementations the intrinsic reward is determined from a combination of the reconstruction objective and the independence objective. The independence objective can be used as a measure of the optimality of the reconstruction objective, and by combining the reconstruction objective and the independence objective the intrinsic reward can better express the aim that the reconstruction error reduces, ideally towards zero, as the environment model learns to represent the true environment.

In some implementations the intrinsic reward, $\mathcal{R}$, is determined as a weighted sum of the reconstruction loss and the independence loss. For example the intrinsic reward can be determined from $$\frac{1}{\lambda}\mathcal{R}^{rec} + \mathcal{R}^{ind}$$

where $\mathcal{R}^{rec}$ is determined as $\mathcal{L}^{rec}$ or from an average of $\mathcal{L}^{rec}$ $\mathcal{R}^{ind}$ is determined as $\mathcal{L}^{ind}$ or from an average of $\mathcal{L}^{ind}$ and $\lambda$ is a weight hyperparameter, e.g. $\lambda=1$.

In some implementations the intrinsic reward, $\mathcal{R}$, is determined from a n-step trajectory of observations and actions, where n>1. This can involve determining an n-step trajectory of the latent representations by processing an observation representation and an action representation for each of n successive time steps, using the generator neural network, to generate n respective latent representations. The action representations can be representations of actual actions taken by the agent. The observation representations (except for the first, at time t) can be predicted observation representations, e.g. predicted by a rollout of a recurrent neural network as described later. More particularly, the observation representation for each time step in the n-step trajectory after the first can comprise the reconstructed representation from the previous time step.

The n-step trajectory of latent representations can be processed by processing each of the n respective latent representations, in conjunction with a respective observation representation and a respective action representation for each of the n successive time steps, using the environment model neural network, to generate n reconstructed representations. The reconstruction objective and the independence objective can be determined for each step of the n-step trajectory, using the n reconstructed representations and the n respective latent representations. The intrinsic reward, $\mathcal{R}$, can then be determined from a combination, e.g. sum, over each of the n steps of the trajectory, of the reconstruction objective, and optionally the independence objective. The reconstruction objective can be determined from a difference between an observation representation for an actual observation for a time step and the reconstructed representation for the observation at the time step. The independence objective can be determined from, e.g., representations of the actual observation and action for a time step. The n-step trajectory can be determined with n-step hindsight, i.e. after n time steps have passed.

Figure 2:
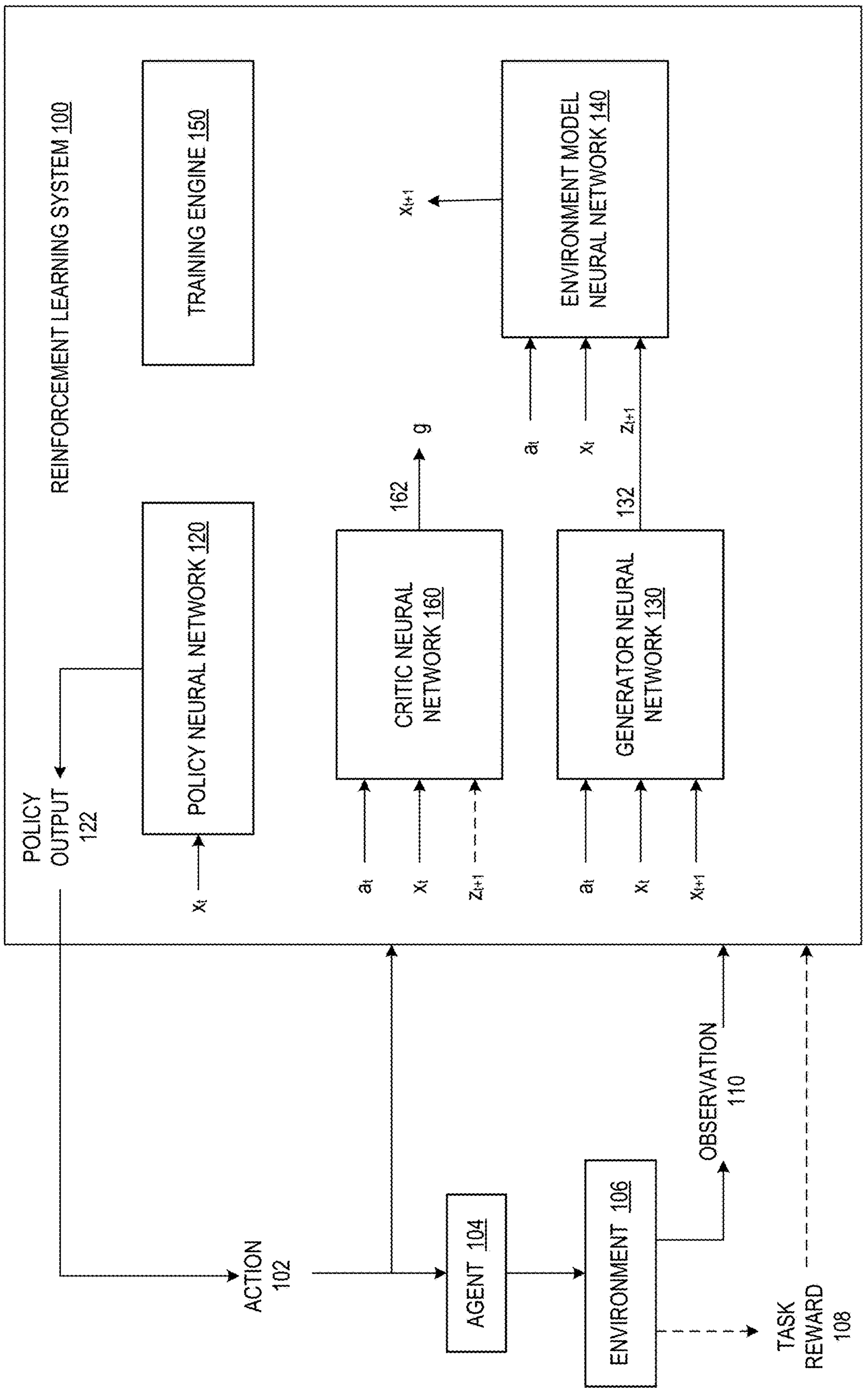
FIG. 2 shows a second example reinforcement learning system.

FIG. 2 shows a second example of a reinforcement learning system 100, in which the system includes a critic neural network 160. The critic neural network 160 is configured to process at least the observation representation at the time step, $x_t$, and the action representation at the time step, at, in accordance with critic neural network parameters, to generate a critic neural network output 162, g. The critic neural network output 162 can be used to determine a value for the independence objective $\mathcal{L}^{ind}$, in various ways.

As one example, the critic neural network 160 can also process the latent representation for the next time step, $z_{t+1}$, to generate a neural network output 162, $g=g(x_t, a_t, z_{t+1})$. The independence loss may then comprise a contrastive loss based on a "positive" example, i.e. $g(x_t, a_t, z_{t+1})$, and on one or more "negative" examples. The contrastive loss can provide a measure of the independence of the latent representation, $z_{t+1}$, from the state representation-action representation pair $x_t$ and $a_t$; more particularly it can provide a lower bound on the information that $z_{t+1}$ contains on $x_t$ and $a_t$.

The one or more negative examples may be generated by processing other state representation-action representation pairs using the generator neural network. The other state representation-action representation pairs may be obtained from interactions of the agent with the environment at other times. For example, where n-step trajectories are processed as described above they may be obtained from other steps in the same trajectory, or from other trajectories.

Thus some implementations of the system process the observation representation at the time step, the action representation at the time step, and the latent representation for the next time step, using the critic neural network and in accordance with the critic neural network parameters, to generate the critic neural network output for the latent representation for the next time step, $g(x_t, a_t, z_{t+1})$. A value of the contrastive loss is then determined using a set of K−1 contrasting or "negative" latent representations, $$z_{t+1}^{1} \ldots z_{t+1}^{K-1}.$$

Each contrasting latent representation of the set can be obtained by processing an observation representation for a different time step (to the current time step), an observation representation for a next time step following the different time step, and an action representation representing an action for the different time step, using the generator neural network, to generate the contrasting latent representation. A set of contrasting critic neural network outputs can then be obtained by, for each contrasting latent representation, processing the observation representation for the different time step, the action representation for the different time step, and the contrasting latent representation, using the critic neural network, to generate the contrasting critic neural network output.

The value of the contrastive loss can then be determined from the critic neural network output for the latent representation for the next time step and the set of contrasting critic neural network outputs, and this can be used as the independence loss, $\mathcal{L}^{ind}$. For example, the value of the contrastive loss, i.e. the independence loss $\mathcal{L}^{ind}$, can be determined as:

$$\mathcal{L}^{ind} = \log \frac{e^{g(x_t,a_t,z_{t+1})}}{\frac{1}{K}\left(e^{g(x_t,a_t,z_{t+1})} + \sum_{i=1}^{K-1} e^{g(x_t,a_t,Z^i_{t+1})}\right)}$$

As previously mentioned, the critic neural network 160 can be trained using the independence loss $\mathcal{L}^{ind}$.

As another example, the critic neural network 160 can be trained to generate the critic neural network output 160 as an output, e.g. a classification output, that attempts to predict the latent representation for the next time step from the observation representation at the time step and from the action representation representing the action performed at the time step. Then the independence loss can be determined based on a comparison of the critic neural network output and the latent representation for the next time step. This may comprise, e.g., determining a difference between distributions of the critic neural network output and of the latent representation for the next time step, e.g. using KL divergence, or by determining the conditional mutual information between the critic neural network output and the latent representation for the next time step. Further details of determining an independence maximization loss in this way can be found in Mesnard et al., "Counterfactual Credit Assignment in Model-Free Reinforcement Learning", arXiv:2011.09464.

Figure 3:
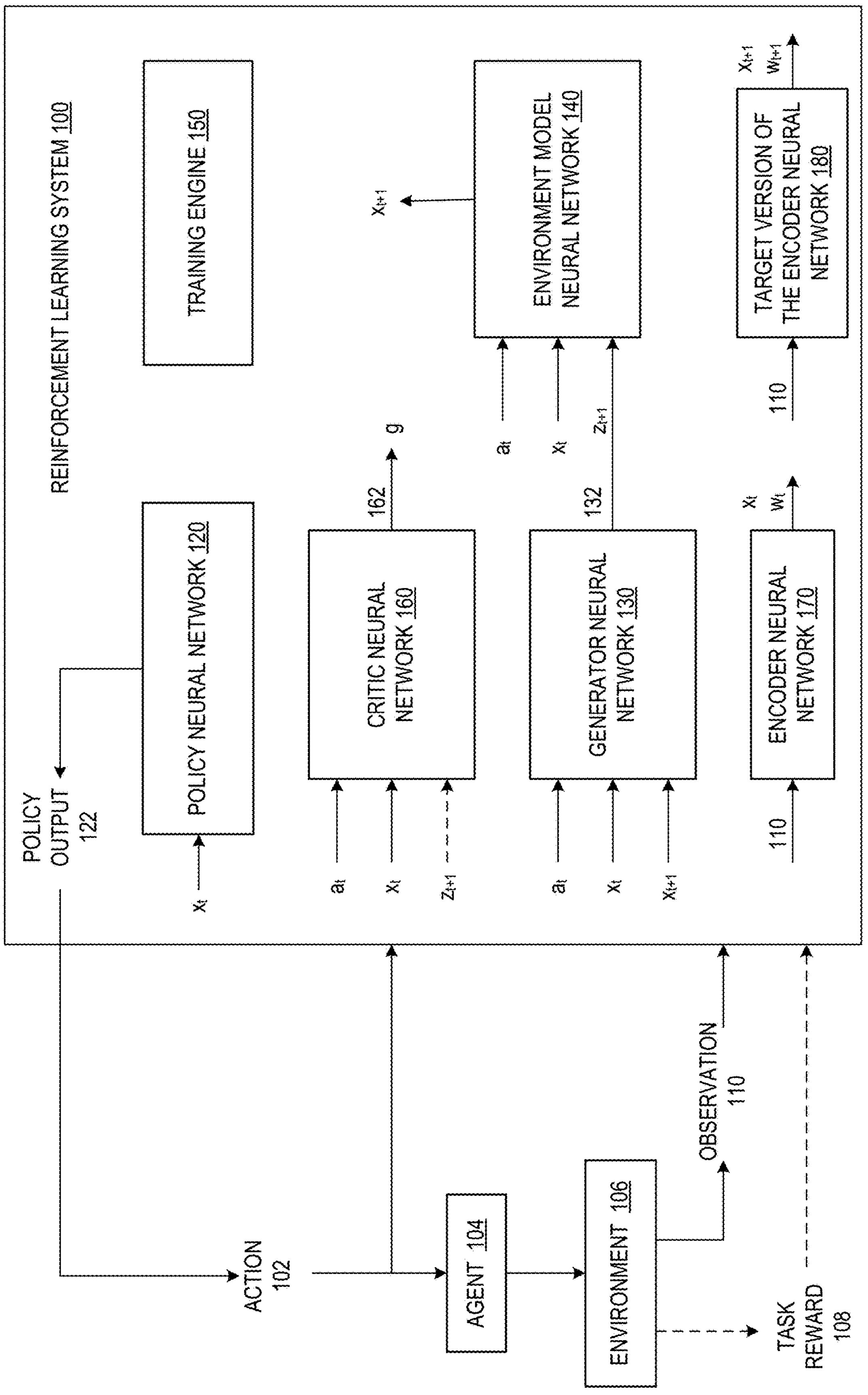
FIG. 3 shows a third example reinforcement learning system.

FIG. 3 shows a third example of a reinforcement learning system 100, in which the system also includes an encoder neural network 170 and a target version of the encoder neural network 180. The target version of the encoder neural network 180 can have the same architecture as the encoder neural network 170 but different parameter values. For example, values of the parameters, e.g. weights, of the target encoder neural network can be a moving average, e.g. an exponential moving average, of values of the parameters of the encoder neural network. This provides a mechanism for the system to use self-supervised learning in which the encoder neural network 170 is trained using targets generated by the target version of the encoder neural network 180. In implementations the targets are obtained (in hindsight) from future observations of the environment.

In more detail, the encoder neural network 170 is configured to process an observation 110 of the environment, in accordance with encoder neural network parameters, to generate an observation representation. The target version of the encoder neural network 180 is similarly configured to process an observation 110 of the environment, in accordance with target encoder neural network parameters, to generate an observation representation.

In implementations the encoder neural network 170 processes the observation of the environment at the current time step to generate the observation representation at the (current) time step. The target version of the encoder neural network 180 processes the observation of the environment at the next time step to generate a version of the observation representation at the next time step, i.e. the previously described version of the observation representation used for training the environment neural network.

In some implementations the version of the observation representation at the next time step and the reconstructed representation for the observation at the next time step are each normalized, e.g. using an L2 norm, when determining the reconstruction objective.

The encoder neural network 170 can be trained, e.g. whilst training one or both of the generator neural network 130 and the environment model neural network 140, i.e. using one or both of the independence objective and the reconstruction objective. This can be done by backpropagating gradients back into the encoder neural network 170 to update the encoder neural network parameters.

In implementations the target encoder neural network parameters are not trained directly. Instead, the parameters of the target version of the encoder neural network 180 are updated based on the parameters of the encoder neural network 170, e.g. based on a moving average of these parameters, more specifically an exponential moving average. As an example, the target encoder neural network parameters, $\xi$, may be determined as $\xi \leftarrow \tau\xi + (1-\tau)\theta$, where $\theta$ represents the parameters of the encoder neural network 170 and i is a decay rate in the range [0,1].

In some implementations, where the intrinsic reward, $\mathcal{R}$, is determined from a n-step trajectory of observations and actions, the environment model neural network 140 can include an environment model recurrent neural network. The system can then maintain a hidden state of the environment model recurrent neural network representing a state of the n-step trajectory for each of the n successive time steps, and can generate each of the n reconstructed representations using the respective state of the n-step trajectory, i.e. using the corresponding hidden state of the environment model recurrent neural network.

In some implementations the generator neural network 130 includes a generator recurrent neural network. The system can then maintain a hidden state of the generator recurrent neural network representing a history of previously processed observation representations and action representations, and generate the latent representation for the next time step using the hidden state of the generator recurrent neural network.

Figure 4:
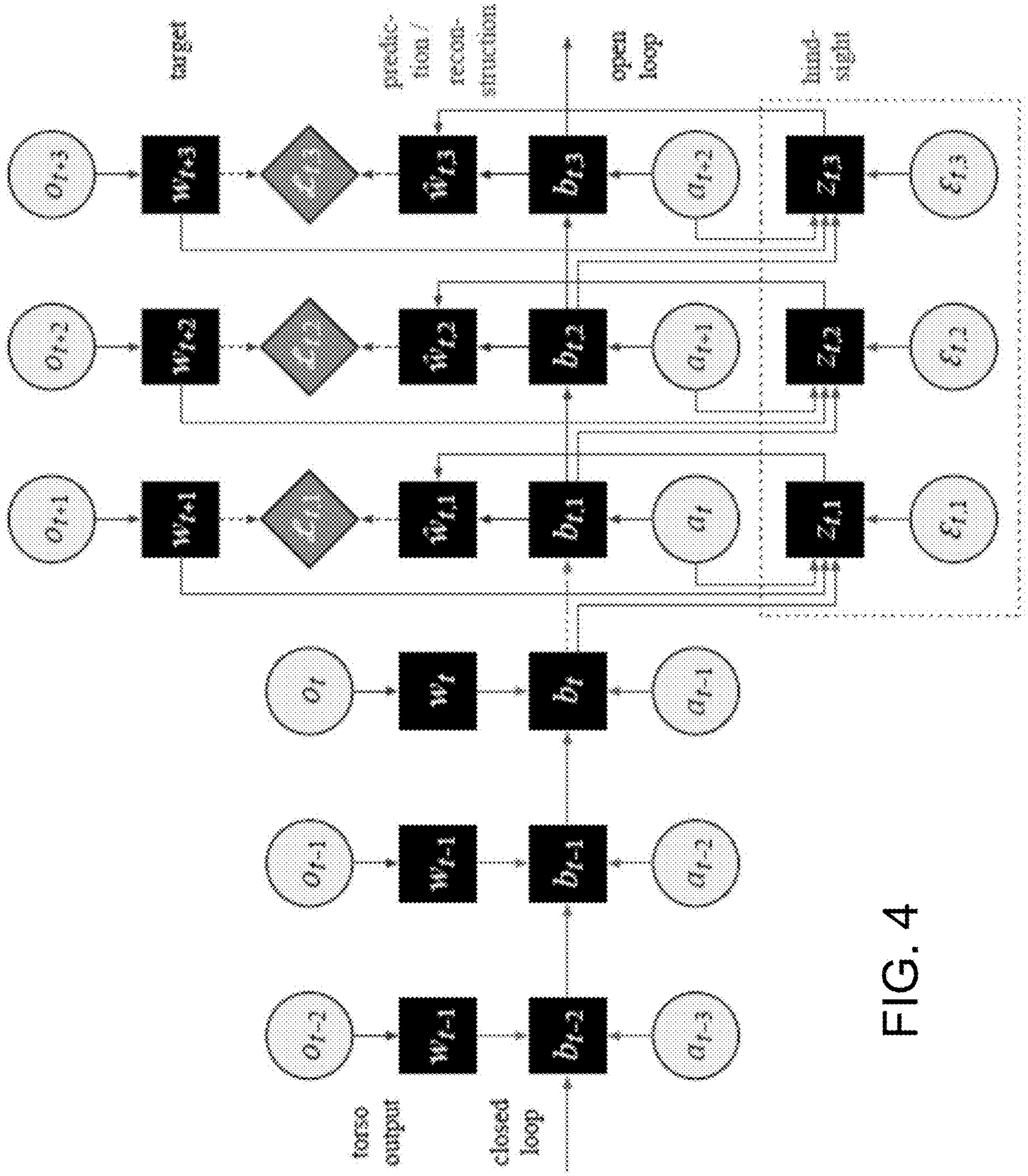
FIG. 4 shows, schematically, computations in an example reinforcement learning system.

FIG. 4 shows, schematically, computations in an example of a reinforcement learning system 100 of the type shown in FIG. 3 that also includes an environment model recurrent neural network and a generator recurrent neural network. In this example the observation at a time t is shown as $o_t$, the action at time t is shown as at, and the hidden state of the "closed loop" generator recurrent neural network hidden state at time t is shown as $b_t$. The observation representation for time t generated by the encoder neural network 170 is shown as $w_t$; and the version of the observation representation at time t+1, generated by the target version of the encoder neural network 180, is shown as $w_t$+. The latent representation for t+1 is shown as $z_{t,1}$, and the reconstructed representation for the observation at time t+1 is shown as $w_{t+1}$. The hidden state of the "open loop" environment model recurrent neural network at time t+ is shown as $b_{t,1}$. In FIG. 4, merely for representational purposes, the stochasticity is shown explicitly as E.

Figure 5:
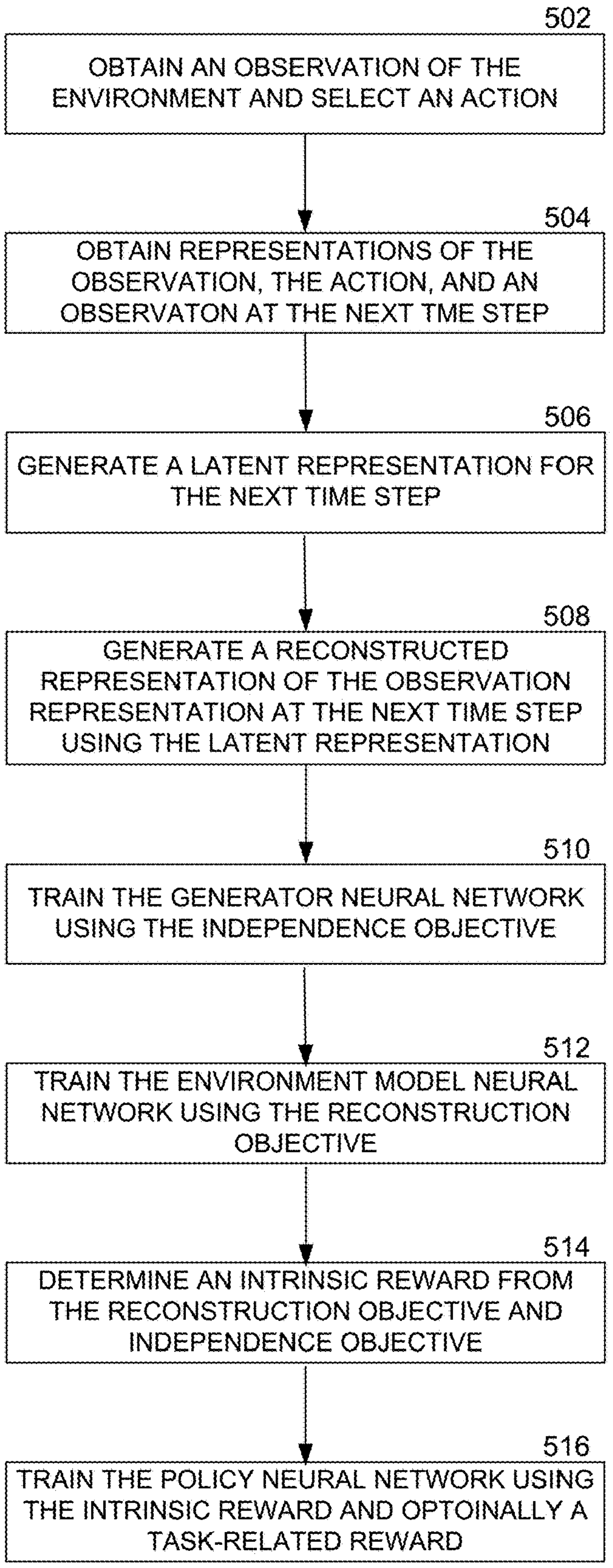
FIG. 5 is a flow diagram of an example process for training a reinforcement learning system.

FIG. 5 is a flow diagram of an example process for training a reinforcement learning system. The process of FIG. 5 may be implemented by one or more computers in one or more locations.

The process obtains an observation of the environment at a time step, and processes the observation using the policy neural network 120 to select an action to be performed by the agent (step 502).

The process obtains an observation representation representing the observation of the environment at the time step, an action representation representing the action performed at the time step, and an observation representation representing an observation of the environment at a next time step (step 504).

The process generates a latent representation for the next time step by processing the observation representation at the time step, an observation representation at the next time step, and the action representation for the time step, using the generator neural network 130 (step 506).

The process generates a reconstructed representation for the observation at the next time step by processing the observation representation at the time step, the action representation for the time step, and the latent representation for the next time step, using the environment model neural network 140 (step 508).

The process trains the generator neural network 130 using the independence objective (step 510), and trains the environment model neural network 140 using the reconstruction objective (step 512).

The process determines an intrinsic reward using the reconstruction objective, and optionally the independence objective (step 514).

The process trains the policy neural network based on the intrinsic reward (step 516). In some implementations the process determines a combined reward from the intrinsic reward and a task-related reward 108 from the environment, e.g. from a weighted sum of these rewards.

The process of FIG. 5 can be performed at each of a succession of times steps, processing the next observation in hindsight, but the training steps do not need to be performed synchronously with the steps at which the agent acts in the environment. The process can be performed n time steps in hindsight where an n-step trajectory of latent representations is determined. The steps do not necessarily have to be performed in the order shown in FIG. 5.

Figure 6:
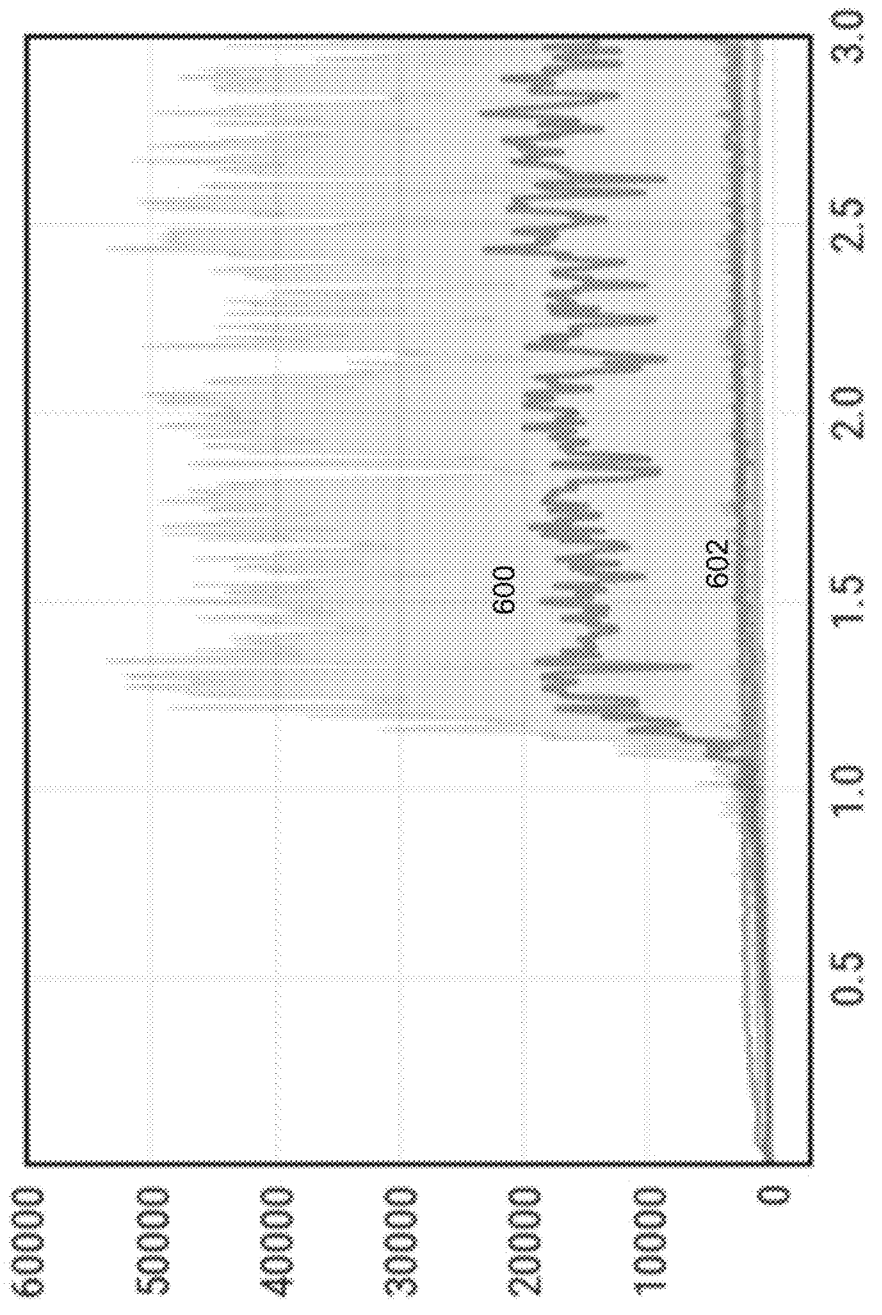
FIG. 6 illustrates the performance of a reinforcement learning system as described herein.

FIG. 6 shows a graph of return (time discounted sum of rewards) on the y-axis against number of training steps (in millions) on the x-axis, comparing the performance of a system as described herein, curve 600, against that of some other techniques, curves 602, in an environment that includes stochastic traps i.e. sources of stochastic noise. It can be seen that implementations of the techniques described herein are able to learn despite the existence of such traps.

The techniques described herein are widely applicable and are not limited to one specific implementation. However, for illustrative purposes, a small number of example implementations are described below.

In some implementations, the environment is a real-world environment, the agent is a mechanical agent interacting with the real-world environment, e.g., a robot or an autonomous or semi-autonomous vehicle operating in or navigating through the environment, and the actions are actions taken by the mechanical agent in the real-world environment to perform the task. For example, the agent may be a robot interacting with the environment to accomplish a specific task, e.g., to locate or manipulate an object of interest in the environment or to move an object of interest to a specified location in the environment or to navigate to a specified destination in the environment.

In these implementations, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control signals to control the robot or other mechanical agent, e.g., torques for the joints of the robot or higher-level control commands, or the autonomous or semi-autonomous land, air, sea vehicle, e.g., torques to the control surface or other control elements e.g. steering control elements of the vehicle, or higher-level control commands. The control signals can include for example, position, velocity, or force/torque/acceleration data for one or more joints of a robot or parts of another mechanical agent. The control signals may also or instead include electronic control data such as motor control data, or more generally data for controlling one or more electronic devices within the environment the control of which has an effect on the observed state of the environment. For example in the case of an autonomous or semi-autonomous land or air or sea vehicle the control signals may define actions to control navigation e.g. steering, and movement e.g., braking and/or acceleration of the vehicle.

In some implementations the environment is a simulation, e.g. of the above-described real-world environment, and the agent is implemented as one or more computers interacting with the simulated environment. For example the simulated environment may be a simulation of a robot or vehicle and the reinforcement learning system may be trained on the simulation and then, once trained, used in the real-world.

In some implementations the environment is a real-world manufacturing environment for manufacturing a product, such as a chemical, biological, or mechanical product, or a food product. As used herein a "manufacturing" a product also includes refining a starting material to create a product, or treating a starting material e.g. to remove pollutants, to generate a cleaned or recycled product. The manufacturing plant may comprise a plurality of manufacturing units such as vessels for chemical or biological substances, or machines, e.g. robots, for processing solid or other materials. The manufacturing units are configured such that an intermediate version or component of the product is moveable between the manufacturing units during manufacture of the product, e.g. via pipes or mechanical conveyance. As used herein manufacture of a product also includes manufacture of a food product by a kitchen robot.

The agent may comprise an electronic agent configured to control a manufacturing unit, or a machine such as a robot, that operates to manufacture the product. That is, the agent may comprise a control system configured to control the manufacture of the chemical, biological, or mechanical product. For example the control system may be configured to control one or more of the manufacturing units or machines or to control movement of an intermediate version or component of the product between the manufacturing units or machines.

As one example, a task performed by the agent may comprise a task to manufacture the product or an intermediate version or component thereof. As another example, a task performed by the agent may comprise a task to control, e.g. minimize, use of a resource such as a task to control electrical power consumption, or water consumption, or the consumption of any material or consumable used in the manufacturing process.

The actions may comprise control actions to control the use of a machine or a manufacturing unit for processing a solid or liquid material to manufacture the product, or an intermediate or component thereof, or to control movement of an intermediate version or component of the product within the manufacturing environment e.g. between the manufacturing units or machines. In general the actions may be any actions that have an effect on the observed state of the environment, e.g. actions configured to adjust any of the sensed parameters described below. These may include actions to adjust the physical or chemical conditions of a manufacturing unit, or actions to control the movement of mechanical parts of a machine or joints of a robot. The actions may include actions imposing operating conditions on a manufacturing unit or machine, or actions that result in changes to settings to adjust, control, or switch on or off the operation of a manufacturing unit or machine.

The task-related rewards may relate to a metric of performance of the task. For example in the case of a task that is to manufacture a product the metric may comprise a metric of a quantity of the product that is manufactured, a quality of the product, a speed of production of the product, or to a physical cost of performing the manufacturing task, e.g. a metric of a quantity of energy, materials, or other resources, used to perform the task. In the case of a task that is to control use a resource the matric may comprise any metric of usage of the resource.

In general observations of a state of the environment may comprise any electronic signals representing the functioning of electronic and/or mechanical items of equipment. For example a representation of the state of the environment may be derived from observations made by sensors sensing a state of the manufacturing environment, e.g. sensors sensing a state or configuration of the manufacturing units or machines, or sensors sensing movement of material between the manufacturing units or machines. As some examples such sensors may be configured to sense mechanical movement or force, pressure, temperature; electrical conditions such as current, voltage, frequency, impedance; quantity, level, flow/movement rate or flow/movement path of one or more materials; physical or chemical conditions e.g. a physical state, shape or configuration or a chemical state such as pH; configurations of the units or machines such as the mechanical configuration of a unit or machine, or valve configurations; image or video sensors to capture image or video observations of the manufacturing units or of the machines or movement; or any other appropriate type of sensor. In the case of a machine such as a robot the observations from the sensors may include observations of position, linear or angular velocity, force, torque or acceleration, or pose of one or more parts of the machine, e.g. data characterizing the current state of the machine or robot or of an item held or processed by the machine or robot. The observations may also include, for example, sensed electronic signals such as motor current or a temperature signal, or image or video data for example from a camera or a LIDAR sensor. Sensors such as these may be part of or located separately from the agent in the environment.

In some implementations the environment is the real-world environment of a service facility comprising a plurality of items of electronic equipment, such as a server farm or data center, for example a telecommunications data center, or a computer data center for storing or processing data, or any service facility. The service facility may also include ancillary control equipment that controls an operating environment of the items of equipment, for example environmental control equipment such as temperature control e.g. cooling equipment, or air flow control or air conditioning equipment such as a heater, a cooler, a humidifier, or other hardware that modifies a property of air in the real-world environment. The task may comprise a task to control, e.g. minimize, use of a resource, such as a task to control electrical power consumption, or water consumption. The agent may comprise an electronic agent configured to control operation of the items of equipment, or to control operation of the ancillary, e.g. environmental, control equipment.

In general the actions may be any actions that have an effect on the observed state of the environment, e.g. actions configured to adjust any of the sensed parameters described below. These may include actions to control, or to impose operating conditions on, the items of equipment or the ancillary control equipment, e.g. actions that result in changes to settings to adjust, control, or switch on or off the operation of an item of equipment or an item of ancillary control equipment.

In general observations of a state of the environment may comprise any electronic signals representing the functioning of the facility or of equipment in the facility. For example a representation of the state of the environment may be derived from observations made by any sensors sensing a state of a physical environment of the facility or observations made by any sensors sensing a state of one or more of items of equipment or one or more items of ancillary control equipment. These include sensors configured to sense electrical conditions such as current, voltage, power or energy; a temperature of the facility; fluid flow, temperature or pressure within the facility or within a cooling system of the facility; or a physical facility configuration such as whether or not a vent is open.

The task-related rewards may relate to a metric of performance of the task. For example in the case of a task to control, e.g. minimize, use of a resource, such as a task to control use of electrical power or water, the metric may comprise any metric of use of the resource.

In some implementations the environment is the real-world environment of a power generation facility e.g. a renewable power generation facility such as a solar farm or wind farm. The task may comprise a control task to control power generated by the facility, e.g. to control the delivery of electrical power to a power distribution grid, e.g. to meet demand or to reduce the risk of a mismatch between elements of the grid, or to maximize power generated by the facility. The agent may comprise an electronic agent configured to control the generation of electrical power by the facility or the coupling of generated electrical power into the grid. The actions may comprise actions to control an electrical or mechanical configuration of an electrical power generator such as the electrical or mechanical configuration of one or more renewable power generating elements e.g. to control a configuration of a wind turbine or of a solar panel or panels or mirror, or the electrical or mechanical configuration of a rotating electrical power generation machine. Mechanical control actions may, for example, comprise actions that control the conversion of an energy input to an electrical energy output, e.g. an efficiency of the conversion or a degree of coupling of the energy input to the electrical energy output. Electrical control actions may, for example, comprise actions that control one or more of a voltage, current, frequency or phase of electrical power generated.

The task-related rewards may relate to a metric of performance of the task. For example in the case of a task to control the delivery of electrical power to the power distribution grid the metric may relate to a measure of power transferred, or to a measure of an electrical mismatch between the power generation facility and the grid such as a voltage, current, frequency or phase mismatch, or to a measure of electrical power or energy loss in the power generation facility. In the case of a task to maximize the delivery of electrical power to the power distribution grid the metric may relate to a measure of electrical power or energy transferred to the grid, or to a measure of electrical power or energy loss in the power generation facility.

In general observations of a state of the environment may comprise any electronic signals representing the electrical or mechanical functioning of power generation equipment in the power generation facility. For example a representation of the state of the environment may be derived from observations made by any sensors sensing a physical or electrical state of equipment in the power generation facility that is generating electrical power, or the physical environment of such equipment, or a condition of ancillary equipment supporting power generation equipment. Such observations may thus include observations of wind levels or solar irradiance, or of local time, date, or season. Such sensors may include sensors configured to sense electrical conditions of the equipment such as current, voltage, power or energy; temperature or cooling of the physical environment; fluid flow; or a physical configuration of the equipment; and observations of an electrical condition of the grid e.g. from local or remote sensors. Observations of a state of the environment may also comprise one or more predictions regarding future conditions of operation of the power generation equipment such as predictions of future wind levels or solar irradiance or predictions of a future electrical condition of the grid.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In a similar way the environment may be a drug design environment such that each state is a respective state of a potential pharmaceutically active compound pharmaceutically active compound and the agent is a computer system for determining elements of the pharmaceutically active compound and/or a synthetic pathway for the pharmaceutically active compound. The drug/synthesis may be designed based on a reward derived from a target for the pharmaceutically active compound, for example in simulation. As another example, the agent may be a mechanical agent that performs or controls synthesis of the pharmaceutically active compound.

In some applications the agent may be a software agent i.e. a computer program, configured to perform a task. For example the environment may be a circuit or an integrated circuit design or routing environment and the agent may be configured to perform a design or routing task for routing interconnection lines of a circuit or of an integrated circuit e.g. an ASIC. The reward(s) may then be dependent on one or more routing metrics such as interconnect length, resistance, capacitance, impedance, loss, speed or propagation delay; and/or physical line parameters such as width, thickness or geometry, and design rules. The reward(s) may also or instead include one or more reward(s) relating to a global property of the routed circuitry e.g. component density, operating speed, power consumption, material usage, a cooling requirement, level of electromagnetic emissions, and so forth. The observations may be e.g. observations of component positions and interconnections; the actions may comprise component placing actions e.g. to define a component position or orientation and/or interconnect routing actions e.g. interconnect selection and/or placement actions. The task may be, e.g., to optimize circuit operation to reduce electrical losses, local or external interference, or heat generation, or to increase operating speed, or to minimize or optimize usage of available circuit area. The method may include making the circuit or integrated circuit to the design, or with interconnection lines routed as determined by the method.

In some applications the agent is a software agent and the environment is a real-world computing environment. In one example the agent manages distribution of tasks across computing resources e.g. on a mobile device and/or in a data center. In these applications, the observations may include observations of computing resources such as compute and/or memory capacity, or Internet-accessible resources; and the actions may include assigning tasks to particular computing resources. The reward(s) may be configured to maximize or minimize one or more of: utilization of computing resources, electrical power, bandwidth, and computation speed.

In another example the software agent manages the processing, e.g. by one or more real-world servers, of a queue of continuously arriving jobs. The observations may comprise observations of the times of departures of successive jobs, or the time intervals between the departures of successive jobs, or the time a server takes to process each job, e.g. the start and end of a range of times, or the arrival times, or time intervals between the arrivals, of successive jobs, or data characterizing the type of job(s). The actions may comprise actions that allocate particular jobs to particular computing resources; the reward(s) may be configured to minimize an overall queueing or processing time or the queueing or processing time for one or more individual jobs, or in general to optimize any metric based on the observations.

As another example the environment may comprise a real-world computer system or network, the observations may comprise any observations characterizing operation of the computer system or network, the actions performed by the software agent may comprise actions to control the operation e.g. to limit or correct abnormal or undesired operation e.g. because of the presence of a virus or other security breach, and the reward(s) may comprise any metric(s) that characterizing desired operation of the computer system or network.

In some applications, the environment is a real-world computing environment and the software agent manages distribution of tasks/jobs across computing resources e.g. on a mobile device and/or in a data center. In these implementations, the observations may comprise observations that relate to the operation of the computing resources in processing the tasks/jobs, the actions may include assigning tasks/jobs to particular computing resources, and the reward(s) may relate to one or more metrics of processing the tasks/jobs using the computing resources, e.g. metrics of usage of computational resources, bandwidth, or electrical power, or metrics of processing time, or numerical accuracy, or one or more metrics that relate to a desired load balancing between the computing resources.

In some applications the environment is a data packet communications network environment, and the agent is part of a router to route packets of data over the communications network. The actions may comprise data packet routing actions and the observations may comprise e.g. observations of a routing table which includes routing metrics such as a metric of routing path length, bandwidth, load, hop count, path cost, delay, maximum transmission unit (MTU), and reliability. The task-related reward(s) may be defined in relation to one or more of the routing metrics i.e. configured to maximize one or more of the routing metrics.

In some other applications the environment is an Internet or mobile communications environment and the agent is a software agent which manages a personalized recommendation for a user. The observations may comprise previous actions taken by the user, e.g. features characterizing these; the actions may include actions recommending items such as content items to a user. The task-related reward(s) may be configured to maximize one or more of: an estimated likelihood that the user will respond favorably to being recommended the (content) item, a suitability unsuitability of one or more recommended items, a cost of the recommended item(s), and a number of recommendations received by the user, optionally within a time span.

As a further example, the actions may include presenting advertisements, the observations may include advertisement impressions or a click-through count or rate, and a task-related reward may characterize previous selections of items or content taken by one or more users.

In some cases, the observations may include textual or spoken instructions provided to the agent by a third-party (e.g., an operator of the agent). For example, the agent may be an autonomous vehicle, and a user of the autonomous vehicle may provide textual or spoken instructions to the agent (e.g., to navigate to a particular location).

As another example the environment may be an electrical, mechanical or electro-mechanical design environment, e.g. an environment in which the design of an electrical, mechanical or electro-mechanical entity is simulated. The simulated environment may be a simulation of a real-world environment in which the entity is intended to work. The task may be to design the entity. The observations may comprise observations that characterize the entity, i.e. observations of a mechanical shape or of an electrical, mechanical, or electro-mechanical configuration of the entity, or observations of parameters or properties of the entity. The actions may comprise actions that modify the entity e.g. that modify one or more of the observations. The task-related rewards may comprise one or more metric of performance of the design of the entity. For example task-related rewards may relate to one or more physical characteristics of the entity such as weight or strength or to one or more electrical characteristics of the entity such as a measure of efficiency at performing a particular function for which the entity is designed. The design process may include outputting the design for manufacture, e.g. in the form of computer executable instructions for manufacturing the entity. The process may include making the entity according to the design. Thus the design of an entity may be optimized, e.g. by reinforcement learning, and then the optimized design output for manufacturing the entity, e.g. as computer executable instructions; an entity with the optimized design may then be manufactured.

As previously described the environment may be a simulated environment. Generally in the case of a simulated environment the observations may include simulated versions of one or more of the previously described observations or types of observations and the actions may include simulated versions of one or more of the previously described actions or types of actions. For example the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. Generally the agent may be implemented as one or more computers interacting with the simulated environment.

The simulated environment may be a simulation of a particular real-world environment and agent. For example, the system may be used to select actions in the simulated environment during training or evaluation of the system and, after training, or evaluation, or both, are complete, may be deployed for controlling a real-world agent in the particular real-world environment that was the subject of the simulation. This can avoid unnecessary wear and tear on and damage to the real-world environment or real-world agent and can allow the control neural network to be trained and evaluated on situations that occur rarely or are difficult or unsafe to re-create in the real-world environment. For example the system may be partly trained using a simulation of a mechanical agent in a simulation of a particular real-world environment, and afterwards deployed to control the real mechanical agent in the particular real-world environment. Thus in such cases the observations of the simulated environment relate to the real-world environment, and the selected actions in the simulated environment relate to actions to be performed by the mechanical agent in the real-world environment.

In some implementations the agent comprises a human user of a digital assistant such as a smart speaker, smart display, or other device. Then the digital assistant can be used to instruct the user to perform actions. For example, the reinforcement learning system may output to the human user, via the digital assistant, instructions for actions for the user to perform at each of a plurality of time steps. In this context an "action" may be a high level action, e.g. a sub-task of an overall task. The instructions may for example be generated in the form of natural language, e.g. transmitted as sound and/or as text on a screen, based on actions chosen by the reinforcement learning system. The reinforcement learning system chooses the actions such that they contribute to performing a task. An observation capture subsystem, e.g. a monitoring system such as a video camera or sound capture system, may be provided to capture visual and/or audio observations of the user performing a task. This can be used for monitoring the action, if any, which the user actually performs at each time step. It can also be used to detect whether, e.g. due to human error, the user action is different from the action that the reinforcement learning system instructed the user to perform. Using the monitoring system the reinforcement learning system can determine whether the task has been completed. Task-related rewards may be generated, for example, by comparing the action the user took with a corpus of data showing a human expert performing the task. In these implementations, if the user performs actions incorrectly, e.g. if they perform a different action from the one the reinforcement learning system instructed, this adds one more source of noise to any sources of noise which may already exist in the environment. In some implementations during the training process the reinforcement learning system can learn to identify actions which the user performs incorrectly with more than a certain probability. If so, when the reinforcement learning system instructs the user to perform such an identified action, the reinforcement learning system may warn the user to be careful, or may learn not to instruct the user to perform the identified action. In some implementations task-related rewards may be generated based on the observations and also, e.g., from video data representing one or more examples of the task, or from a simulation of the overall task. The digital assistant device can include a natural language user interface and an assistance subsystem configured to determine, in response to a request, a series of actions for the user to perform. In implementations this may comprise a generative (large) language model, in particular for dialog, e.g. a conversation agent such as LaMDA, Sparrow, or Chinchilla; this may be implemented locally or remotely.

In some of the implementations described above the environment may include a human being or animal. For example, the agent may be an autonomous vehicle in an environment which is a location where there are human beings, e.g. pedestrians or drivers/passengers of other vehicles and/or animals, or the autonomous vehicle itself may contain human beings. As another example the environment may include at least one room, e.g. in a habitation, containing one or more people. The human being or animal may be an element of the environment which is involved in the task.

In a further example the environment may comprise a human user who interacts with an agent which is in the form of an item of user equipment, e.g. a computer, mobile device, or digital assistant. The item of user equipment provides a user interface between the user and a computer system, which may be the same computer system(s) which implement the reinforcement learning system, or a different computer system. The user interface may allow the user to enter data into and/or receive data from the computer system, and the agent may be controlled by the action selection policy to perform an information transfer task in relation to the user, such as providing information about a topic to the user and/or allowing the user to specify a component of a task which the computer system is to perform. For example, the information transfer task may be to teach the user a skill, such as how to speak a language or how to navigate around a geographical location. As another example the task may be to allow the user to define a three-dimensional shape to the computer system, e.g. so that the computer system can control an additive manufacturing (3D printing) system to produce an object having the shape. Actions may comprise outputting information to the user, e.g. in a certain format, at a certain rate, etc., and/or configuring the interface to receive input from the user. For example, an action may comprise setting a problem for a user to perform relating to the skill, e.g. asking the user to choose between multiple options for correct usage of the language, or asking the user to speak a passage of the language out loud, and/or receiving input from the user, e.g. registering selection of one of the options, or using a microphone to record the spoken passage of the language. Task-related rewards may be generated based upon a measure of how well the task is performed. For example, this may be done by measuring how well the user learns the topic, e.g. performs instances of the skill, e.g. as measured by an automatic skill evaluation unit of the computer system. In this way, a personalized teaching system may be provided, tailored to the aptitudes and current knowledge of the user. In another example, when the information transfer task is to specify a component of a task which the computer system is to perform, the action may comprise presenting a user interface to the user, e.g. a visual, haptic or audio interface, which permits the user to specify an element of the component of the task, and receiving user input using the user interface. The task-related rewards may be generated based on a measure of how well and/or easily the user can specify the component of the task for the computer system to perform, as an example, how fully or well the three-dimensional object is specified. This may be determined automatically, or a task-related reward may be specified by the user, e.g. as a subjective measure of the user experience. In this way, a personalized system may be provided for the user to control the computer system, again tailored to the aptitudes and current knowledge of the user.

Optionally, in any of the above implementations, the observation at any given time step may include data from a previous time step that may be beneficial in characterizing the environment, e.g., the action performed at the previous time step, the reward received at the previous time step, or both.

Generally, in implementations of the system the agent can interact with one or more other agents in the environment that may be performing similar or different tasks. For example, where the agent comprises a robot or vehicle performing a task such as warehouse or logistics automation, or package delivery control, the system can disregard novelty induced by other robots or vehicles, or humans, when exploring the environment. As another example, where the environment is a computer environment the system can disregard novelty induced by other software agents or humans when exploring the computing environment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The typical elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of selecting actions to be performed by an agent in an environment using a policy neural network, comprising:

obtaining an observation representation representing an observation of the environment at a time step;

processing the observation of the environment at the time step using the policy neural network to generate a policy output used to select an action to be performed by the agent at the time step;

processing the observation representation at the time step, an observation representation at a next time step, and an action representation representing the action performed at the time step, using a generator neural network to generate a latent representation for the next time step;

processing the observation representation at the time step, the action representation at the time step, and the latent representation for the next time step, using an environment model neural network to generate a reconstructed representation for the observation at the next time step;

training the environment neural network using a reconstruction objective that depends on a difference between a version of the observation representation at the next time step and the reconstructed representation for the observation at the next time step;

training the generator neural network using an independence objective that depends on a degree of independence between the latent representation for the next time step and each of i) the observation representation at the time step and ii) the action representation representing the action performed at the time step, to encourage the degree of independence;

determining an intrinsic reward using the reconstruction objective; and training the policy neural network based on the intrinsic reward using a reinforcement learning technique.

2. The method of claim 1, wherein the latent representation comprises a representation of unpredictable future noise in the environment, wherein the future noise is independent of a current state of the environment and a current action performed by the agent.

3. The method of claim 1, comprising determining the intrinsic reward from a combination of the reconstruction objective and the independence objective.

4. The method of claim 3, wherein the reconstruction objective comprises a reconstruction loss, wherein the independence objective comprises an independence loss, and wherein determining the intrinsic reward comprises determining a weighted sum of the reconstruction loss and the independence loss.

5. The method of claim 1, further comprising:

processing at least the observation representation at the time step and the action representation at the time step using a critic neural network to generate a critic neural network output; and determining a value for the independence objective using the critic neural network output.

6. The method of claim 5, further comprising:

processing the observation representation at the time step, the action representation at the time step, and the latent representation for the next time step using the critic neural network to generate the critic neural network output for the latent representation for the next time step;

determining a value of a contrastive loss by:

determining a set of one or more contrasting latent representations by, for each contrasting latent representation, processing an observation representation for a different time step, an observation representation for a next time step following the different time step, and an action representation representing an action for the different time step, using the generator neural network, to generate the contrasting latent representation;

determining a set of contrasting critic neural network outputs by, for each contrasting latent representation, processing the observation representation for the different time step, the action representation for the different time step, and the contrasting latent representation, using the critic neural network, to generate the contrasting critic neural network output; and determining the value of the contrastive loss from the critic neural network output for the latent representation for the next time step and the set of contrasting critic neural network outputs; and determining the value of the independence objective from the value of the contrastive loss.

7. The method of claim 6, further comprising training the critic neural network using the independence objective.

8. The method of claim 5, further comprising:

training the critic neural network to generate a critic neural network output that attempts to predict the latent representation for the next time step from the observation representation at the time step and from the action representation representing the action performed at the time step; and wherein determining the independence loss based on a comparison of the critic neural network output and the latent representation for the next time step.

9. The method of claim 3, further comprising:

determining an n-step trajectory of latent representations by processing an observation representation and an action representation for each of n successive time steps, using the generator neural network, to generate n respective latent representations, where n>1;

processing the n-step trajectory of latent representations by processing each of the n respective latent representations in conjunction with a respective observation representation and a respective action representation for each of the n successive time steps, using the environment model neural network to generate n reconstructed representations;

determining the reconstruction objective and the independence objective for each step of the n-step trajectory, using the n reconstructed representations and the n respective latent representations; and determining the intrinsic reward from a combination over the steps of the n-step trajectory, of the reconstruction objective and the independence objective.

10. The method of claim 9, further comprising determining the respective observation representation for each time step after a first time step in the n-step trajectory as the reconstructed representation from the previous time step.

11. The method of claim 9, wherein the environment model neural network includes an environment model recurrent neural network, the method further comprising:

maintaining a hidden state of the environment model recurrent neural network representing a state of the n-step trajectory for each of the n successive time steps; and generating each of the n reconstructed representations using the hidden state of the environment model recurrent neural network for the respective state of the n-step trajectory.

12. The method of claim 1, wherein the generator neural network includes a generator recurrent neural network, the method further comprising:

maintaining a hidden state of the generator recurrent neural network representing a history of previously processed observation representations and action representations; and generating the latent representation for the next time step using the hidden state of the generator recurrent neural network.

13. The method of claim 1, wherein the version of the observation representation at the next time step is the observation representation at the next time step.

14. The method of claim 1, further comprising:

processing the observation of the environment at the time step using an encoder neural network to generate the observation representation; and processing the observation of the environment at the next time step using a target version of the encoder neural network to generate the version of the observation representation at the next time step;

training the encoder neural network using one or both of the independence objective and the reconstruction objective; and updating parameters of the target version of the encoder neural network based on the parameters of the encoder neural network.

15. The method of claim 1, wherein the agent interacts with the environment to perform a particular task, the method further comprising:

receiving a task-related reward in response to the action performed at the time step;

determining a combined reward from the task-related reward and the intrinsic reward; and training the policy neural network based on the combined reward using the reinforcement learning technique.

16. The method of claim 1, wherein the environment is a real-world or simulated real-world environment, wherein the agent is a mechanical agent or simulated mechanical agent, and wherein the policy neural network system is used to select actions to be performed by the agent in response to observations obtained from the environment, to control the agent.

17. The method of claim 1, wherein the agent is a software agent, wherein the environment is a natural language processing environment, wherein the policy neural network comprises a language model neural network configured to process a natural language observation to generate a sequence of tokens from a vocabulary of tokens, and wherein the action at a time step relates to selection of a token or to selection of the sequence of tokens.

18. A computer-implemented method of training a policy neural network for controlling actions performed by an agent in an environment, comprising:

training a generator neural network, in hindsight, using an independence objective, to generate a latent representation that comprises a representation of unpredictable future noise in the environment independent of a current state of the environment and a current action performed by the agent;

training an environment neural network, using a reconstruction objective, to generate a reconstructed representation of a future state of the environment based on a representation of the current state of the environment, a representation of the current action, and the latent representation;

determining an intrinsic reward from at least the reconstruction objective; and training the policy neural network using the intrinsic reward.

19. The method of claim 18, comprising determining the intrinsic reward from a combination of the reconstruction objective and the independence objective.

20. A system comprising:

one or more computers; and one or more storage devices storing instructions that, when executed by the one or more computers, cause the one or more computers to perform operations for selecting actions to be performed by an agent in an environment using a policy neural network, the operations comprising:

obtaining an observation representation representing an observation of the environment at a time step;

processing the observation of the environment at the time step using the policy neural network to generate a policy output used to select an action to be performed by the agent at the time step;

processing the observation representation at the time step, an observation representation at a next time step, and an action representation representing the action performed at the time step, using a generator neural network to generate a latent representation for the next time step;

processing the observation representation at the time step, the action representation at the time step, and the latent representation for the next time step, using an environment model neural network to generate a reconstructed representation for the observation at the next time step;

training the environment neural network using a reconstruction objective that depends on a difference between a version of the observation representation at the next time step and the reconstructed representation for the observation at the next time step;

training the generator neural network using an independence objective that depends on a degree of independence between the latent representation for the next time step and each of i) the observation representation at the time step and ii) the action representation representing the action performed at the time step, to encourage the degree of independence;

determining an intrinsic reward using the reconstruction objective; and training the policy neural network based on the intrinsic reward using a reinforcement learning technique.

* * * * *